United States Patent
Trotter

Patent Number: 6,159,068
Date of Patent: Dec. 12, 2000

[54] TURKEY CALL

[76] Inventor: Charles Trotter, 415 Barringer School La., Anna, Ill. 62906

[21] Appl. No.: 09/237,438

[22] Filed: Jan. 26, 1999

[51] Int. Cl.[7] .................................................. A63H 5/00
[52] U.S. Cl. .......................... 446/397; 446/188; 446/418
[58] Field of Search ................... 446/188, 213, 446/397, 404, 421, 418

[56] References Cited

U.S. PATENT DOCUMENTS

| | | |
|---|---|---|
| 2,606,401 | 8/1952 | Boatwright . |
| 2,629,968 | 3/1953 | Herter ..................................... 446/397 |
| 2,958,157 | 11/1960 | Tannehill ................................ 446/397 |
| 3,129,527 | 4/1964 | Williams ................................. 446/397 |
| 3,367,064 | 2/1968 | Anthony et al. ........................ 446/397 |
| 3,927,490 | 12/1975 | Grayson . |
| 4,310,986 | 1/1982 | Jacobs .................................... 446/397 |
| 4,586,912 | 5/1986 | Adams . |
| 4,662,858 | 5/1987 | Hall . |
| 4,664,641 | 5/1987 | Hearn et al. ............................ 446/397 |
| 4,854,914 | 8/1989 | White, Jr. ................................ 446/397 |
| 4,897,067 | 1/1990 | Piper ....................................... 446/188 |
| 4,941,858 | 7/1990 | Adams . |
| 4,955,845 | 9/1990 | Piper ....................................... 446/397 |
| 4,988,325 | 1/1991 | Alderson et al. . |
| 5,066,260 | 11/1991 | Lindler . |

*Primary Examiner*—Sam Rimell
*Attorney, Agent, or Firm*—Polster, Lieder, Woodruff & Lucchesi

[57] ABSTRACT

The present invention relates to a turkey call comprising a substantially oval shaped, partially hollow body of wood or other suitable material, open on one long side to form a sound chamber, the exposed edges of the opening forming an effective striking surface; and an elongated striker made of wood or other suitable material having one face at least partially treated with a substance to increase the frictional properties of the striker when it contacts the sound chamber.

7 Claims, 3 Drawing Sheets

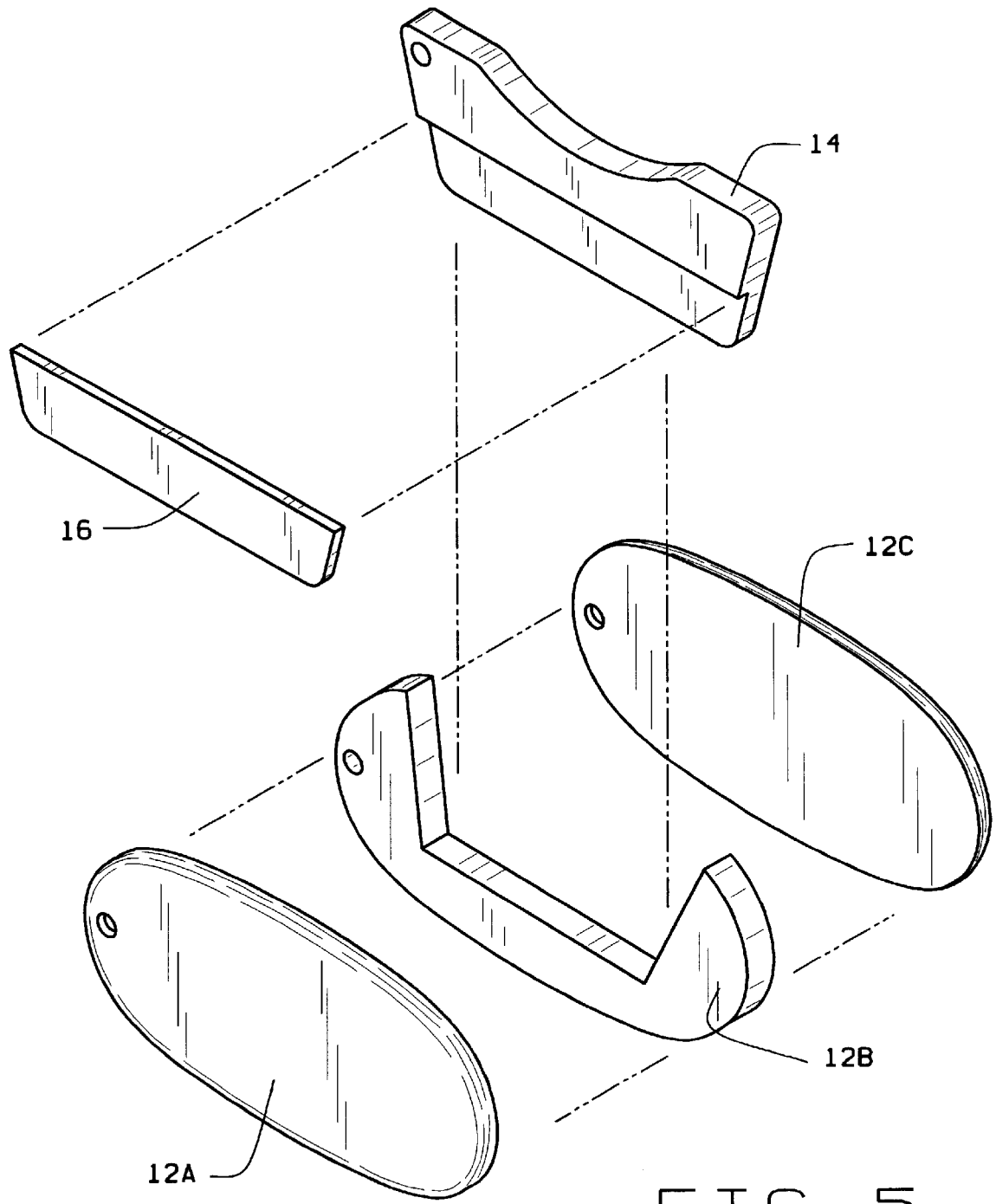

TURKEY CALL

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to a Turkey Call which provides a large number of features not found in turkey calls.

Wild turkeys have been hunted in North America for several centuries. Although hunting turkeys is an exciting sport, wild turkeys are very difficult to kill. These turkeys are easily alarmed so it is not practical to advance upon the turkey because any noise produced will alarm the turkey and the turkey will flee the area. Typically, wild turkeys are hunted by attracting the turkey to the hunter with a call and then killing the turkey as the turkey approaches the area of the hunter.

Vocalization by turkeys varies according to gender and age. In fact parallels can be drawn between humans and turkeys. For instance juvenile females tend to have higher pitched clearer voices whereas mature female voices become deeper and raspier with age. Juvenile males have relatively high-pitched somewhat scratchy voices with tones that break awkwardly and the adult males have deeper more coarse tones and generally speak with a slower cadence.

The habits of turkeys vary according to the seasons of the year. Spring hunting season coincides with the wild turkeys' mating season. During this time, adult male turkeys gobble to announce their presence to the hens. Spring turkey hunters usually imitate the sounds of hens hoping to entice a gobbler, i.e. male turkey, to investigate the source. However, in some situations, a hunter may imitate a juvenile male evoking jealousy and promoting a confrontation with the dominant adult male of a particular area.

In the Fall, the adult hens are protective of their juvenile brood. Imitating the call of a lost young turkey will sometimes attract an adult hen. Conversely, the assembly call a hen turkey uses to gather her young, can be imitated in hope of attracting young birds that may have been separated from their flock. There at least 25 known calls in a wild turkey's vocabulary.

Experienced hunters demand a call that can imitate specific turkey language. The turkey call of the present invention is very versatile in this respect.

SUMMARY OF THE INVENTION

The present invention provides a turkey call comprising two pieces. The first piece is a sound chamber substantially oval in shape having a predetermined thickness which is a partially hollow body of wood or other suitable material with an opening to the hollow portion on one long edge of the thickness. The exposed edges of the opening form an effective striking surface. The length of the oval sound chamber is approximately twice that of the width of the same sound chamber.

The other piece is an elongated striker made of wood or other suitable material Generally, the striker will be made of the same material as the sound chamber. For instance, if the sound chamber is made of wood, then the striker will be made of wood. The striker is substantially rectangular and will have at least a portion of one face of the striker treated with a substance to increase the frictional properties of the striker when it contacts the sound chamber on the edge of the opening to the hollow portion of the chamber. Examples of such substances are slate or chalk. The striker will have a thickness commensurate with one of the walls of the sound chamber. It is desirable to have the striker proportioned to slidably fit at least partially into the hollow portion of the sound chamber to allow carrying of the sound chamber and the striker as a single unit. In addition, the striker may be attached to the sound chamber by means of a flexible cord such as a lanyard.

Suitable materials used to form the sound chamber include wood, blended thermal plastics, acoustical graphite, styrene, glass-filled plastic, acoustic-grade injection-molded polymer with a carbon surface, injection-molded graphite, graphite-reinforced plastic, carbon-filled plastic, and aluminum, preferably a high grade aluminum.

The turkey call sound chamber may be made from one or more pieces of material. For example, if the sound chamber is a single piece of wood, then the wood is hollowed out to form the sound chamber. An advantage of this method of formation of the sound chamber is that when finished, the sound chamber has no glue joints. However, a disadvantage of this method, is that it is much more time consuming to make.

A second method of formation of the sound chamber is to construct the hollow body. The first step is to pencil reference marks on a blank which will enable reassembling in the correct original orientation of the material. Two flat face surfaces are sliced off of the blank and the remaining center section is then marked using a template to delineate the waste area that is to be removed. At this point, all three parts, two sides and the center section with the waste material removed, are oversized. This allows for thickness reduction to facilitate matching of the mating surfaces prior to assembly. The sides are then thinned so as to tune them in accordance with the desired result. The mating surfaces of the three parts are joined and additional sanding takes place to create both aesthetic and functional properties.

The striker is formed of the same material and is generally a rectangular piece with a thickness approximately equal to that of one side of the sound chamber. The preferred shape of the striker is that of a trapezoid with the shorter of the two long sides being treated to provide frictional properties so when it is struck across the sound chamber opening the desired sounds are obtained.

BRIEF DESCRIPTION OF THE DRAWINGS

FIG. 5 is an exploded view depicting the turkey call.

DETAILED DESCRIPTION OF THE INVENTION

Figure 1:
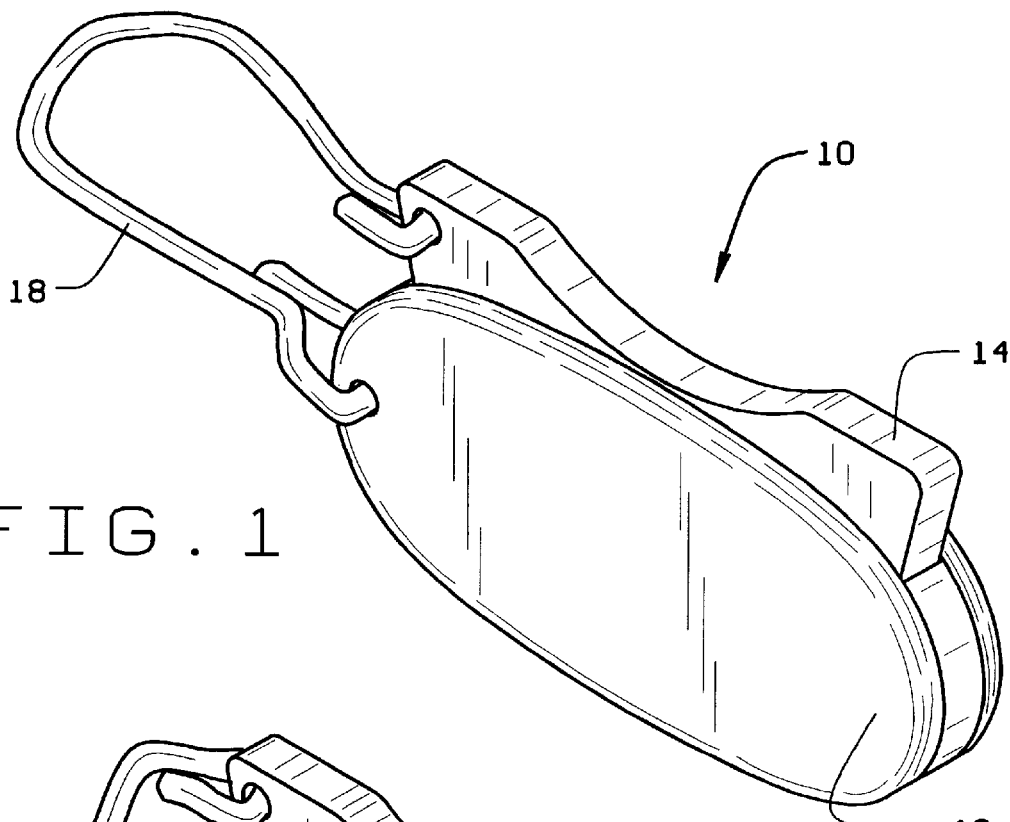
FIG. 1 is a perspective view of the turkey call of the present invention in a carrying position.
Figure 2:
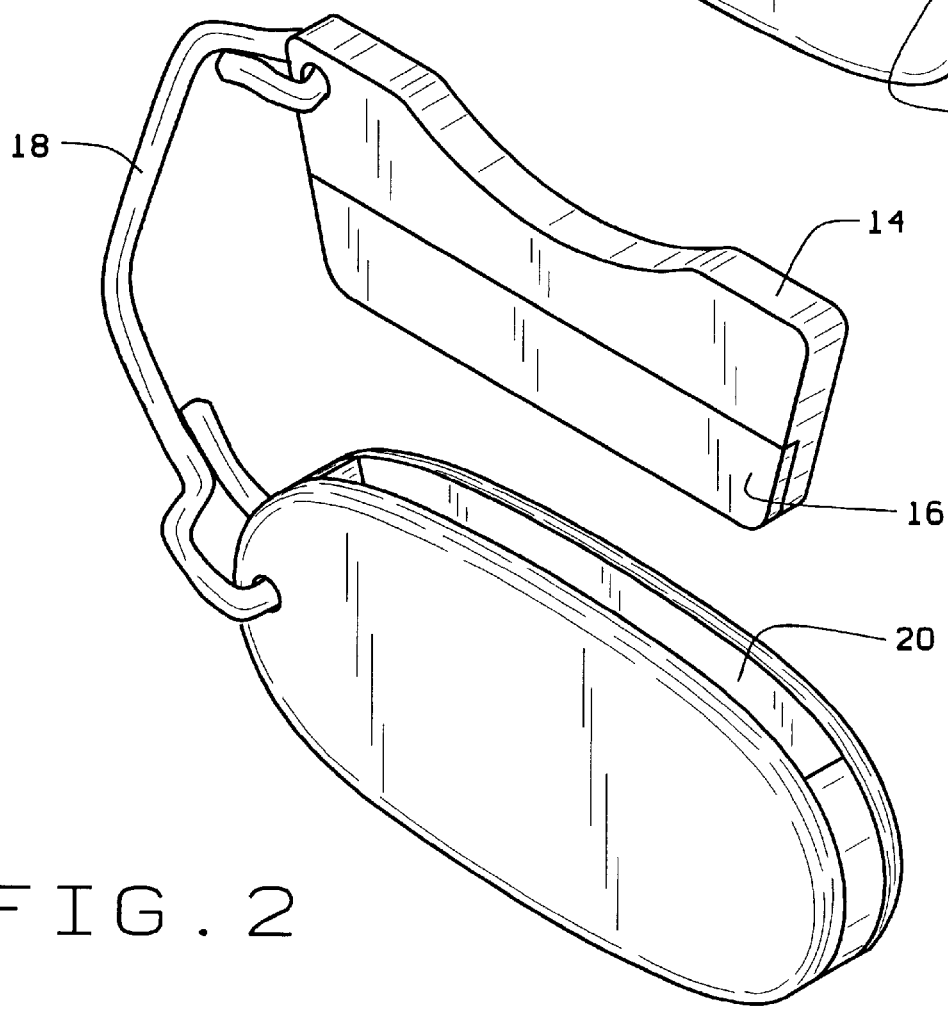
FIG. 2 is a perspective view of the turkey call of the present invention in a position ready for use.

FIG. 1 depicts a turkey call 10 of the present invention. A sound chamber 12 is hollow and a striker 14 is fitted into the sound chamber as a wedge is fit into a slot. A lanyard 18 connects the striker and the sound chamber so that when as depicted in FIG. 2, the striker is removed from the sound chamber, the striker 14 would not be dropped. The sound chamber 12 has a hollow region 20 which allows for resonant sound to be effected when the striker 14 is utilized so that a slate portion 16 of the striker 14 comes in contact with the edges of the sound chamber 20.

Figure 3:
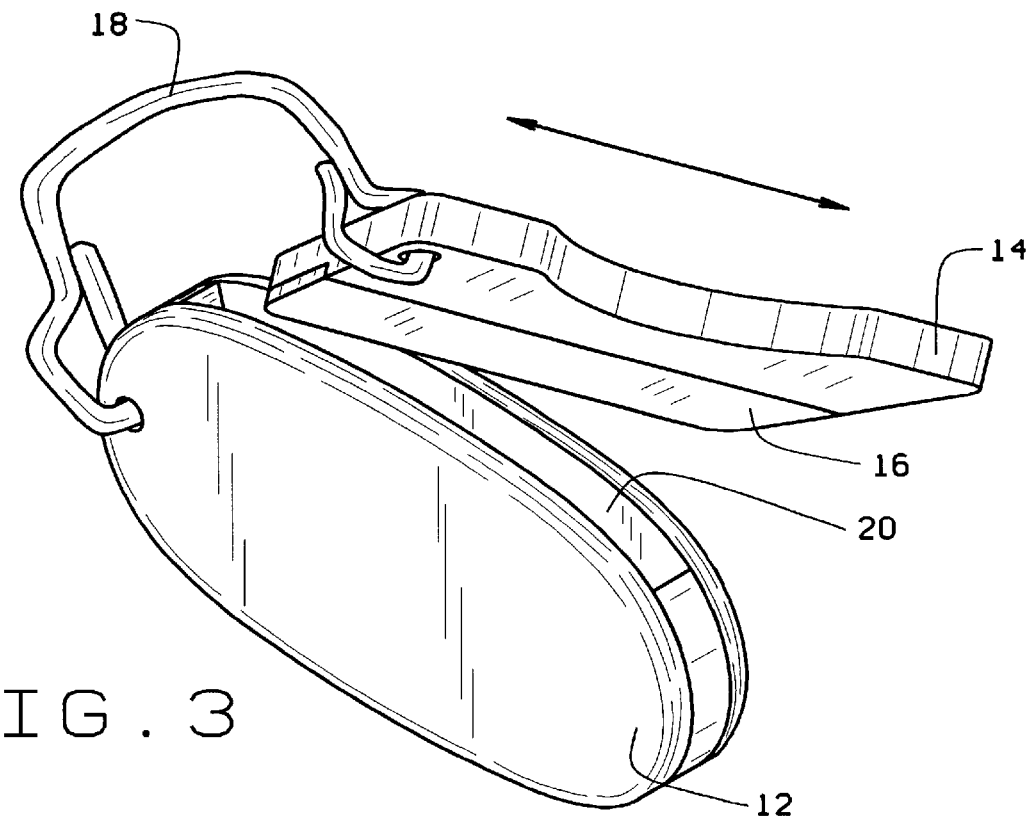
FIG. 3 is the turkey call of the present invention in a perspective view as it is being used.

FIG. 3 depicts the turkey call in a position of use whereupon the slate 16 of the striker 14 is being placed in frictional contact with the sound chamber 12 as it is rubbed along the edge, thus allowing the hollow portion 20 of the sound chamber 12 to provide a resonating sound. The lanyard 18 prevents the two pieces from accidentally being separated and creating a noise which might alert the turkeys of the presence of someone nearby.

Figure 4:
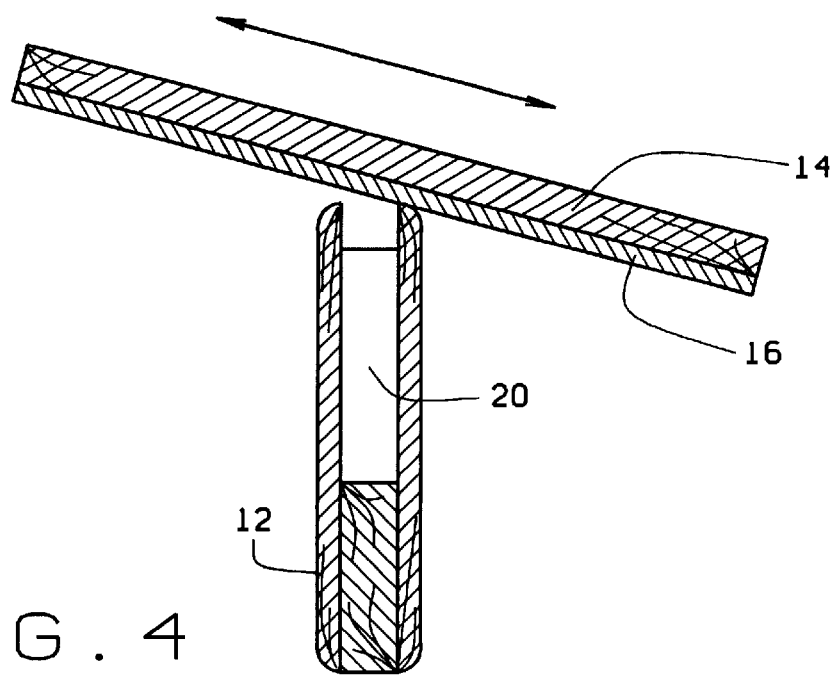
FIG. 4 is a side elevational view depicting the turkey call of the present invention in use.

FIG. 4 is a side elevational view depicting the turkey call of the present invention showing an end view of the sound chamber 12 with the hollow portion 20. The striker 14 with the slate portion 16 is in contact with the side edge of the hollow sound chamber 12.

Selection of the raw material is very important. For instance, in selecting a wood, the wood must be free of knots, sap pockets, or other inclusions as well as splits and insect damage. Preferably, the wood will have a moisture content of about 7% to 9%. This is generally the optimal moisture content for dimensional stability. Dry wood is stiffer and has better acoustical properties than a moist wood. Wood that exhibits evenly spaced growth rings is most desirable. Evenly spaced growth rings contribute to a wood dimensional stability in acoustical properties. The preferred orientation of the growth rings with respect to a board's widest surface is either quarter-sawn or flat-sawn. In the quarter-sawn orientation the wide face of the board is oriented on the radius of the tree stem, so the wide face will be perpendicular to the growth rings. In the flat-sawn orientation, the wide face of the board is parallel to the growth rings. A board which is representative of either of these orientations is more predictable in terms of dimensional stability than those of another orientation. Quarter-sawn wood tends to be stiffer than flat-sawn wood and therefore is preferable for some applications. Generally, only a small percentage of boards are by strict definition either quarter-sawn or flat-sawn. Most boards are a combination of the two and therefore are less desirable.

When preparing a preferred embodiment of the present invention, a board approximately 7–8 inches thick which meets the above criteria is chosen. A template is then placed on the board and oriented so the long axis of the template is parallel to the length of the board. The substantially oval shape which will become the body of the sound chamber of the call is traced with a pencil. A band saw is used to cut the oval shaped blank from the board. As discussed heretofore, the blank must now be made hollow and in this embodiment the method selected is the construction of the hollow body. In this instance, a "sawn and glued" body is selected which is comprised of three pieces. Two flat faces which are sliced off of a blank and identified as side boards are prepared, each being approximately ¼ inch thick. The remaining center section, approximately ⅜ inch thick is then marked using the template to delineate the waste area that is to be removed. This waste area forms the hollow region of the sound chamber. Each of the side boards is affixed to the center section delineated as 12b in FIG. 5.

Some of the basic design principles for constructing a sound chamber are as follows:

(1) A thicker sideboard produces a higher note and a thinner sideboard produces a lower note.

(2) A shorter sideboard i.e. top to bottom, produces a higher note and a longer sideboard produces a lower note.

(3) A lighter weight striker produces a higher note and a heavier one produces a lower note.

(4) Proportionately smaller sound chambers tend to produce higher pitched sounds and proportionately larger sound chambers tend to produce lower pitched sounds.

(5) The degree of curvature or radius incorporated in the body of the call and striker face determines the amount of contact between the parts.

(6) A relatively thin sideboard results in a call body that produces a "flat" sounding low-pitched sound. A thicker wall provides a higher pitch.

The physical weight of the striker has a similar effect to wall thickness. A heavier striker results in a lower note. A lighter weight striker results in a higher note. In addition to the weight of the striker, surface texture, composition and density affect the frictional characteristics of the striker. For instance, in a comparison between a striker made of oak and one made of red cedar, oak is by nature a heavy rough textured wood. Red cedar is a light-weight, smooth textured wood. Two identical size strikers, one of oak and one of red cedar, will have very different effects on the sound produced.

A common practice is the application of chalk to striking surfaces of wood friction calls. Chalk has the effect of increasing friction and at the same time allowing more control of the sound produced. Slate applied to the surface of the striker influences the characteristics of the sound produced. Although slate is a type of stone, it shares some characteristics with chalk namely, small grain size and homogenous texture. Slate is a soft stone and close examination of the lip of a call after having been struck or rubbed with slate will reveal traces of the positive slate particles. This slate residue has a buffering effect similar to that of chalk.

Proportionate size of the sound chamber is also a consideration when constructing the call that is intended to produce a particular tone. For example, if a hunter requests a call that will effectively imitate the lower more coarse tones of an adult male turkey, the call would be constructed with thinner sideboards and a heavier striker to contribute this tone. A slightly larger sound chamber adds a richness to the sound produced. The opposite is true for a higher pitched call. Thicker sideboards, a lighter striker, and a smaller sound chamber are the most effective combination of features to produce a higher pitched call.

Adjustments to the size of the sound chamber are planned during construction. The center section of the call body is made thicker or thinner. In either case, generally the length of the sound chamber remains constant. The center section can be the same thickness overall so the sideboards are parallel or the center section can be slightly wedge-shaped, wider at the top, narrower at the bottom, to produce a finished call that flares slightly at the top.

In a preferred embodiment, a curvature is incorporated into both the face of the striker and the striking surface of the sideboards. The top edges of the sideboards will have two arcs incorporated in the design. The diameter of the first arc is equal to or slightly less than the thickness of the sideboard. The apex of this curvature is the point of contact with the striker. The second arc on the sideboard is defined by the oval shape of the body portion of the call. This arc provides variability in tone because the center portion of the sideboard is effectively longer whereas when striking closer to either end, the sideboard is shorter, thus altering the pitch of the tone. If the striker is used near the center of the sideboard, a deeper note is produced and if the striker is used closer to either end of the sideboard, a higher pitched sound is produced. An arc is also formed on one or both faces of the striker. It is the degree of this curvature that determines the amount of contact area between the striker and the lip of the sideboard. In other words, if both the striker face and the lip of the sideboard were flat, the contact area would be much greater. However, the variability of tone and quality of tone would not be available. These arcs provide the user an opportunity to produce a sound with one stroke of the striker that begins with a higher note and ends with a lower note. For instance, a key vocalization in turkey language is known as the "double-note yelp". This is an example of a sound that begins higher and breaks over into a lower note. By rotating the orientation of the long axis of the striker to more or less than perpendicular to the sideboard of the call body, the user can further compound the effect of these rounded edges.

Once the sound chamber is assembled, the first step is to thin the sideboards somewhat and round over the exposed top edges of the sound boards as discussed heretofore. At first, the call will produce only high pitched sounds. As the sideboards are thinned, the pitch will move down the scale. At some point in this process, the sound will be close, but still slightly higher than desired. At this point in the tuning process, it is best if both sideboards produce about the same sound. It is generally desirable to have an even thickness overall of the sideboard, however, a slight taper from bottom to top does not adversely affect the sound of the call. Also, a slight variation in pitch from one sideboard to the other adds some versatility to the call enabling the user to sound like more than one turkey. If the sound chamber does not resonate to the degree desired after the thinning of the sideboard walls, the bottom of the call can be thinned somewhat. However, it should not be made thinner than the side walls.

Generally, during the tuning process of the sound chamber, a striker of intermediate weight is used.

The striker is made to be highly compatible with the sound chamber. Variations are made to determine the weight, composition and curvature that best enhances the sound produced by the sound chamber. The face of the striker is generally tapered being wider at the top and narrower at the bottom, so that the striker will slide into the sound chamber. The striker should be shaped so that the fit into the sound chamber is sufficiently snug that it is not apt to disengage without intentional removal of the striker.

In FIG. 5, a striker is shown wherein a strip of slate 16 is added to the striker and the slate and bottom portion of the striker 14 are curved to have the desired arc to produce the required sound from the call. Preferably a lanyard of leather or nylon cord is threaded through the holes in the sound chamber and the striker so as to connect the two parts, thereby preventing accidental separation of the parts and creating a noise at an undesirable time.

Other materials than wood can be used to construct a satisfactory turkey call. Some calls can be injection molded, whereas others can be constructed in a manner similar to that just discussed for constructing a call made from wood. Generally the striker portion of the call is consistent with the material of the sound chamber or perhaps the face of the striker portion may be partially surfaced with graphite, carbon fiber, a strip of aluminum or the like. The dimensions of calls made from other materials are fairly consistent with their wooden counterparts.

Some of the advantages of a call made in accordance with the present invention is that the shape and size of the call allows for convenient carrying in a shirt or jacket pocket. The striker fits snugly into the sound chamber forming a rattle-free unit. This is very important to the required stealth needed to hunt turkeys. The striker, once chalked, if chalk is being used, and most generally it is, and inserted into the sound chamber, is protected from inadvertently being rubbed free of chalk during the carrying time in a pocket. If slate has been applied to the striker, it is not necessary to use chalk.

EXAMPLE

A call is constructed from wood wherein a board about $7/8$" thick is chosen. Two slices $1/4$" thick are taken from each side leaving a center section of approximately $3/8$". The center section is marked to delineate the waste area that is to be removed as discussed heretofore. At this point, all three parts, i.e., the two sides and the center section with waste material removed, are oversized. This allows for thickness reduction to facilitate truing of the mating surfaces prior to assembly, thinning of the sides and bottom of the hollow area in the tuning process, and final beveling of any square edges for aesthetic purposes.

The second step in construction of the sound chamber involves sanding of the three pieces so as to remove any loose or fuzzy wood fibers resulting from the initial saw cuts. The three pieces are placed together in correct orientation and glued.

Next the sound chamber is tuned by thinning the sideboards somewhat and rounding over the exposed top edges of the sideboards. At first the call may produce only high pitched sounds, but as the sideboards are thinned, the sound will approach the pitch desired. It is desirable if both sound boards have substantially the same pitch.

In the next phase of tuning, calipers are used to check the continuity of the sideboard thickness. If uneven areas are detected, excess material is removed. The arc which forms the lip of the sideboard is refined. The arc is generally reduced in diameter to being slightly less than the thickness of the sideboard. These adjustments do not appreciably change the pitch of the call, but do tend to improve the resonance and hence make the call more responsive. During further fine tuning, a slightly concave areaway is formed on the face of the sideboard. This process adds even more resonance to the sound and slightly lowers the pitch. It should be noted that a slight variation in pitch from one sideboard to the other adds versatility to the call even enabling the user to sound like more than one turkey.

If for some reason, the sound chamber does not resonate to the degree desired, the bottom of the sound chamber can be thinned slightly, however care must be taken not to make the bottom thinner than the thickness of the side walls. If one or both of the sideboards produce a "flat" tone, a slight amount can be removed from the height of the sideboard. This will raise and usually sharpen the note.

When selection of the design of the striker is needed, it is suggested that a variety of strikers be kept at hand so as to test several variations to determine the weight, composition and curvature which best enhances the sound produced by the sound chamber. In the present instance, a board of appropriate species is selected and cut to be about $1/8$" thicker than the opening in the sound chamber. If slate is to be applied to one face of the striker, a channel of appropriate width and depth is milled into the striker face. A strip of slate is inlaid and secured.

The next step is to taper the side edges of the face of the striker to make it wider at the top and narrower at the bottom, so that the striker will slide into the opening in the sound chamber with a satisfactory snug fit.

In a specific embodiment the interior end walls of the center section are slightly flared from the bottom to the top. In other words, the length of the bottom of the sound chamber interior may be up to about 0.5 inch less than the length of the sound chamber interior when measured at the top. The bottom of the sound chamber may be rounded to follow the general oval shape of the exterior. In the particular units discussed here, the depth of the interior of the sound chamber may vary from about 1.75 inches to about 2.9 inches whereas the length of the interior of the sound chamber may range from about 2.5 to about 5.5 inches.

The sideboards of the sound chamber may be flared wherein the interior width of the chamber is less at the bottom than at the top. For instance, the bottom measurement may be ¼ inch wide whereas the top width may be ⅝ inch.

One advantage of the turkey call of the present invention is the size and shape of the call allow convenient carrying of the call in a shirt or jacket pocket. Also the striker fits snugly into the sound chamber to form a rattle-free unit and if chalk has been applied, it is protected from being rubbed off during carrying, handling or the like. The two sideboards combined with a two-sided striker allow greater flexibility in the range of sounds that can be produced. In addition the capability of adding a lanyard prevents loss or separation of the two parts of the call.

What is claimed is:

1. A turkey call comprising a hollow sound chamber defined by two, spaced side boards, of similar width, with opposite broad flat sides, oval in side elevation, free outer edges which extend along an open mouth of the sound chamber, the edges serving as strike surfaces and a spacer center section forming a bottom and side walls of the sound chamber; and a striker having a long dimension and having a flat striking surface with a narrow edge in the long dimension and the edge being adapted to be rubbed on at least one of the sound chamber edges generally in a lineary reciprocating direction and wherein the striker is proportioned to slidably fit at least partially into the hollow sound chamber to allow carrying of the sound chamber and the striker as a single unit.

2. The turkey call of claim 1 wherein both the body and the striker are made of a material selected from the group consisting of wood, blended thermal plastics, acoustical graphite, styrene, glass-filed plastic, acoustic-grade injection-molded polymer with a carbon surface, injection-molded graphite, graphite-reinforced plastic, carbon filled plastic, and aluminum.

3. The turkey call of claim 1 wherein the free edges of the flat sides are arcuate in side elevation.

4. The turkey call of claim 1 wherein the striker is in the form of a regular trapezoid with two parallel sides of unequal length.

5. The turkey call of claim 4 including one of chalk, slate and a combination of chalk and slate along at least one edge of the shorter of the parallel sides.

6. The turkey call of claim 1 wherein the striker is held in the sound chamber by friction to allow the carrying of the sound chamber and the striker as a single unit.

7. The turkey call of claim 1 wherein the striker is attached to the sound chamber by means of a flexible cord.

* * * * *